US008856218B1

(12) United States Patent  (10) Patent No.: US 8,856,218 B1
Inskip  (45) Date of Patent: Oct. 7, 2014

(54) MODIFIED MEDIA DOWNLOAD WITH INDEX ADJUSTMENT

(75) Inventor: Thomas Inskip, Kirkland, WA (US)

(73) Assignee: Google Inc., Mountain View, CA (US)

( * ) Notice: Subject to any disclaimer, the term of this patent is extended or adjusted under 35 U.S.C. 154(b) by 150 days.

(21) Appl. No.: 13/372,049

(22) Filed: Feb. 13, 2012

Related U.S. Application Data

(63) Continuation-in-part of application No. 13/356,163, filed on Jan. 23, 2012.

(60) Provisional application No. 61/570,003, filed on Dec. 13, 2011.

(51) Int. Cl.
*G06F 15/16* (2006.01)

(52) U.S. Cl.
USPC .............................. 709/203; 709/219; 725/90

(58) Field of Classification Search
USPC ........................................................ 709/203
See application file for complete search history.

(56) References Cited

U.S. PATENT DOCUMENTS

| | | | |
|---|---|---|---|
| 2005/0155072 A1 | 7/2005 | Kaczowka et al. | |
| 2006/0037057 A1* | 2/2006 | Xu | 725/90 |
| 2008/0168133 A1* | 7/2008 | Osborne | 709/203 |
| 2009/0132599 A1* | 5/2009 | Soroushian et al. | 707/104.1 |
| 2009/0307258 A1* | 12/2009 | Priyadarshi et al. | 707/102 |
| 2011/0099225 A1* | 4/2011 | Osborne | 709/203 |
| 2011/0238906 A1* | 9/2011 | Amir et al. | 711/111 |
| 2012/0005312 A1* | 1/2012 | McGowan et al. | 709/219 |
| 2012/0005313 A1* | 1/2012 | McGowan et al. | 709/219 |
| 2012/0170642 A1* | 7/2012 | Braness et al. | 375/240.01 |
| 2012/0170915 A1* | 7/2012 | Braness et al. | 386/343 |
| 2012/0210216 A1* | 8/2012 | Hurst | 715/716 |
| 2013/0080267 A1* | 3/2013 | McGowan | 705/14.73 |
| 2013/0080596 A1* | 3/2013 | McGowan | 709/219 |
| 2013/0080772 A1* | 3/2013 | McGowan | 713/165 |
| 2013/0166625 A1* | 6/2013 | Swaminathan et al. | 709/203 |

OTHER PUBLICATIONS

C. Dana, et al., "BASS: BitTorrent Assisted Streaming System for Video-on-Demand," Multimedia Signal Processing, 2005 IEEE 7th Workshop, Oct. 30, 2005-Nov. 2, 2005.
N. Carlsson and D. Eager, "Peer-assisted On-demand Streaming of Stored Media using BitTorrent-like Protocols," Proc. IFIP/TC6 Networking '07, May 2007.
"Hosting Your Videos: Streaming Video vs. Progressive Download," printed from the World Wide Web, http://www.startthefusion.com/streaming-video-vs-progressive-download/, dated Mar. 3rd, 2010.
"Adaptive bitrate streaming," printed from the World Wide Web on Nov. 30, 2011, http://www.en.wikipedia.org/wiki/Adaptive_bitrate_streaming.

* cited by examiner

*Primary Examiner* — Hamza Algibhah
(74) *Attorney, Agent, or Firm* — Fenwick & West LLP

(57) ABSTRACT

A method and corresponding apparatus or system, in which a computing device may obtain an index of a media file, the computing device may use the index as a basis to download just part of the media file as a modified media file, the computing device may adjust the index to account for omission of the remainder of the media file, and the computing device may use the modified index as a basis to play out content of the modified media file.

27 Claims, 8 Drawing Sheets

| MEDIA CONTENT | | | | FILE OFFSET (BYTES) | SIZE (BYTES) |
|---|---|---|---|---|---|
| BR1 | | | | OFFSET1 | SIZE1 |
| | CH1 | | | OFFSET2 | SIZE2 |
| | | SEC1 | | OFFSET3 | SIZE3 |
| | | SEC2 | | OFFSET4 | SIZE4 |
| | | SEC3 | | OFFSET5 | SIZE5 |
| | CH2 | | | OFFSET6 | SIZE6 |
| | TP1 | | | OFFSET7 | SIZE7 |
| | TP2 | | | OFFSET8 | SIZE8 |
| BR2 | | | | OFFSET9 | SIZE9 |
| | CH1 | | | OFFSET10 | SIZE10 |
| | CH2 | | | OFFSET11 | SIZE11 |
| | TP1 | | | OFFSET12 | SIZE12 |
| | TP2 | | | OFFSET13 | SIZE13 |
| BR3 | | | | OFFSET14 | SIZE14 |
| | CH1 | | | OFFSET15 | SIZE15 |
| | CH2 | | | OFFSET16 | SIZE16 |
| | TP1 | | | OFFSET17 | SIZE17 |
| | TP2 | | | OFFSET18 | SIZE18 |

| MEDIA CONTENT | | | FILE OFFSET (BYTES) | SIZE (BYTES) |
|---|---|---|---|---|
| BR1 | | | OFFSET1 | SIZE1 |
| | CH1 | | OFFSET2 | SIZE2 |
| | | SEC1 | OFFSET3 | SIZE3 |
| | | SEC2 | OFFSET4 | SIZE4 |
| | | SEC3 | OFFSET5 | SIZE5 |
| | CH2 | | OFFSET6 | SIZE6 |
| | TP1 | | OFFSET7 | SIZE7 |
| | TP2 | | OFFSET8 | SIZE8 |
| BR2 | | | OFFSET9 | SIZE9 |
| | CH1 | | OFFSET10 | SIZE10 |
| | CH2 | | OFFSET11 | SIZE11 |
| | TP1 | | OFFSET12 | SIZE12 |
| | TP2 | | OFFSET13 | SIZE13 |
| BR3 | | | OFFSET14 | SIZE14 |
| | CH1 | | OFFSET15 | SIZE15 |
| | CH2 | | OFFSET16 | SIZE16 |
| | TP1 | | OFFSET17 | SIZE17 |
| | TP2 | | OFFSET18 | SIZE18 |

| INDEX | |
|---|---|
| U1 | OFFSET1 |
| U2 | OFFSET2 |
| U3 | OFFSET3 |
| U4 | OFFSET4 |

| U1 | U2 | U3 | S1 | U4 |
|---|---|---|---|---|

OFFSET1  OFFSET2  OFFSET3  OFFSET4  OFFSET5

Fig. 4C

| INDEX | |
|---|---|
| U1 | OFFSET1 |
| U4 | OFFSET2 |

Fig. 4D

| INDEX | |
|---|---|
| U1 | OFFSET1 |
| U2 | OFFSET2 |
| U3 | OFFSET3 |
| S1 | OFFSET4 |
| U4 | OFFSET5 |

Fig. 4E

MODIFIED MEDIA DOWNLOAD WITH INDEX ADJUSTMENT

REFERENCE TO RELATED APPLICATIONS

This is a continuation-in-part of U.S. patent application Ser. No. 13/356,163, filed Jan. 23, 2012, and claims priority to U.S. Provisional Patent Application No. 61/570,003, filed Dec. 13, 2011, the entirety of both of which are hereby incorporated by reference.

BACKGROUND

Unless otherwise indicated herein, the materials described in this section are not prior art to the claims and are not admitted to be prior art by inclusion in this section.

With advances in networking and computing technology, it is now commonplace for devices to download, store, and play out media, such as music and movies. In practice, for instance, a computing device may use Hypertext Transfer Protocol (HTTP), File Transfer Protocol (FTP), or another data transfer protocol to download a media file from a network server and may persistently store the downloaded media file in local data storage. Further, the device may include a media player function that enables a user to control playout of the downloaded media file, with features such as play, pause, stop, seek, fast forward, and rewind. Such functionality is now commonly found in numerous devices, such as personal media players, personal computers, cell phones, tablet computers, televisions, home entertainment systems, and in-vehicle entertainment systems, among others.

SUMMARY

Disclosed herein are devices and methods related to media file indexing, downloading, and playout.

In one respect, for instance, disclosed is a non-transitory computer readable medium having stored thereon program instructions executable by a processor to cause a client device to carry out various functions. The functions may include downloading to the client device an index of a media file, wherein the media file contains a plurality of units of data representing media content and the index correlates each of a plurality of pieces of the media content with a respective unit of the plurality of units of data, indicating a file offset where the respective unit is located in the media file. Further, the functions may include using the downloaded index as a basis to request and download to the client device a proper subset of the units of the media file while excluding from download to the client device one or more remaining units of the media file, and storing in data storage a modified media file comprising the downloaded proper subset of the units of data but excluding each remaining unit of the media file.

Still further, the functions may include modifying the downloaded index to create a modified index corresponding with the modified media file, wherein modifying the downloaded index comprises adjusting at least one file offset of the proper subset of units to account for exclusion of the one or more remaining units of the media file. Yet further, the functions may include storing the modified index in the data storage. And the functions may include using the modified index as a basis to play out at least part of the modified media file on a user interface of the client device.

In another respect, disclosed is a client device including a network communication interface, a user interface, a processor, data storage, and program instructions stored in the data storage and executable by the processor to cause the client device to carry out functions such as those noted above. For instance, the functions may include downloading to the client device, via the network communication interface, an index of a media file, wherein the media file has a plurality of units and the index correlates each unit of the plurality with a respective file offset indicating where the unit is located in the media file. Further, the functions may include using the downloaded index as a basis to download to the client device, via the network communication interface, a proper subset of the units of the media file while excluding from download to the client device a remainder of the media file, and storing in the data storage a modified media file comprising the downloaded proper subset of the units but excluding the remainder of the media file.

Further, the functions may include modifying the downloaded index to create a modified index corresponding with the modified media file, wherein modifying the downloaded index comprises adjusting the file offset of each of at least one of the units to account for exclusion of the remainder of the media file from the modified media file, and wherein the modified index correlates each unit of the modified media file with a respective file offset indicating where the unit is located in the modified media file. And the functions may include storing the modified index in the data storage.

In still another respect, disclosed is a method in which a client device receives an index specifying a sequence of media units cooperatively defining media content and the client device takes actions with respect to the index. In accordance with the method, for instance, after receiving the index, the client device may adjust the index to account for a change comprising at least one of (i) omission of part of the media content and (ii) addition to the media content, so that the client device would thereby establish an adjusted index specifying an adjusted sequence of media units cooperatively defining adjusted media content. Further, the client device may download media units of the adjusted sequence and persistently store in data storage the downloaded media units. And the method may then involve using the adjusted media index as a basis to play out the downloaded media units according to the adjusted sequence.

These, as well as other aspects, advantages, and alternatives will become more apparent to those of ordinary skill in the art by reading the following detailed description, with reference where appropriate to the accompanying drawings.

Further, it should be understood that the description provided in this summary section and elsewhere in this document is intended to serve as an example only. For instance, other arrangements and other elements (e.g., machines, interfaces, functions, orders of functions, etc.) can be used instead, and some elements may be omitted altogether. Further, many of the elements described herein are functional entities that may be implemented as discrete or distributed components or in conjunction with other components, and in various suitable combinations and locations.

BRIEF DESCRIPTION OF THE DRAWINGS

FIG. 2 depicts an example index of a media file.

FIGS. 4A-4E depict media file and index arrangements and modifications.

DETAILED DESCRIPTION

Figure 1:
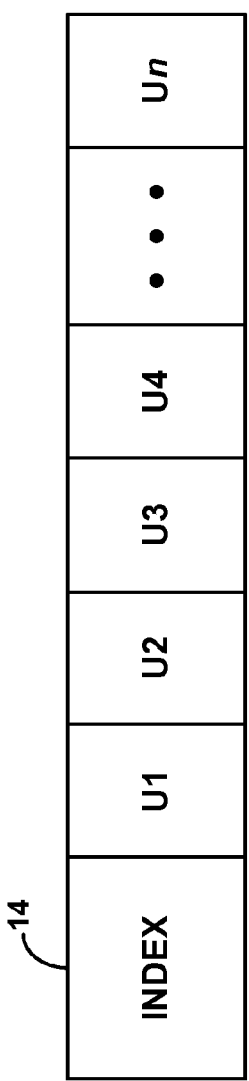
FIG. 1 depicts an example media file including a sequence of media units.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

To facilitate playout of a media file such as an audio or video file for instance, the media file may have an associated index that specifies where particular units of the file are located within the file. For instance, if a media file contains media content such as a song or movie, the index could correlate particular time points or tracks of the media content with particular file offsets within the file. To play out the media content starting or continuing at a particular time point and/or track, a computing device may then refer to the index to determine the file offset corresponding with that particular time point and/or track and may then retrieve from data storage and play out data of the media file beginning at that file offset.

By way of example, the index may specify that the starting point of the media content is located a certain number of bytes from the start of the media file (perhaps after a header portion of the file), and may correlate each additional second or other time increment of the media content with respective additional number of bytes from that start of the media file. To facilitate playout of the media content starting at a particular time point, at user request for instance, the computing device may then refer to the index to determine the file offset corresponding with that time point and may retrieve and play out data of the file beginning at that file offset.

And as another example, the media content may include "trick-play" tracks, such as portions of the media content recorded at double speed (such as by including fewer intermediate frames between i-frames if video media, for instance) that can be played out when a user requests fast-forward playout, or other modified versions of underlying content. In that case, the index may specify for each trick-play track a file offset indicating where the trick-play track is located in the media file, such as how many bytes the track is from the start of the media file or other reference point in the file. Further, the index may correlate time points or other portions each trick-play track with relative file offsets, measured from the start of the trick-play track or other point in the media file for instance. Still further, to the extent the trick-play track corresponds with particular underlying content included in the media file (e.g., normal-speed content), the index may specify for that underlying content the file offset of the trick-play track or may simply correlate the underlying media with the trick-play track listing in the index.

To facilitate playout of a particular trick-play track from the start of the trick-play track or starting at a time point in a trick-play track corresponding with a current playout time point in underlying content, at user request for instance, a computing device may then refer to the index to determine the file offset of the trick-play track, and perhaps a relative file offset of a time point into the trick play track corresponding with the time point in the underlying content. The computing device may then retrieve and play out data of the media file beginning at that determined point in the media file.

As still another example, the media file may include multiple language versions of particular media content (e.g., English, Spanish, French, and other language audio tracks for an audio file and/or multi-media file), to facilitate selective playout of the media content in a desired language. The index may then specify for each language version of the media content where that language version of the media content is located in the media file and further where specific units (e.g., time segments, tracks, etc.) of that language version, perhaps corresponding with particular units of underlying video or other media content are located in the media file, similar to the trick-play tracks discussed above. To facilitate playout of a particular language version of the media content, a computing device may then refer to the index in the manner noted above to determine the file offset of a track and/or time point in the media content of that language, again upon user request for instance, and may retrieve and play out the indicated portion of the media file.

As yet another example, the media file may include a discrete set of sub-tittle data (e.g., closed-captioning data) corresponding with underlying media content in the file. The index may then specify where that subtitle data is located in the media file and further where specific units (e.g., time segments) of the subtitle data corresponding with particular underlying media content (e.g., particular spoken language) are located in the media file. To facilitate presentation of subtitles at appropriate time points during playout of the underlying media content, a computing device may then refer to the index to determine, based on the current playout point of the underlying media content, what the file offset is of the corresponding subtitle data, and the computing device may retrieve and play out that subtitle data in conjunction with the underlying media (e.g., superimposed on corresponding video). Numerous other examples may be possible as well.

In addition to enabling a device to play out a media file as in the above examples for instance, the index of a media file can be used to facilitate transfer of the media file from a network server to a client device for playout at the client device.

By way of example, the media file as stored on a server or otherwise accessible by the server may contain multiple different bit-rate versions of particular media content (e.g., each version being encoded with a different bit-rate codec), including a higher bit-rate version and a lower bit-rate version. As with the examples above, the index of the media file may then specify where each bit-rate version of the media content is located in the media file and, for each bit-rate version, where specific units (e.g., time segments, tracks, etc.) of that bit-rate version are located in the media file. In practice, the server may then use the index as a basis to retrieve and stream particular bit-rate versions of the media content to a client device and to switch from streaming one bit-rate version to streaming another bit-rate version. For instance, the server may initially stream a higher bit-rate version of the media content to the client device, but in response to network congestion or another trigger, the server may transition to stream a lower bit-rate version of the media content to the client device. To do this, the server may refer to the index to determine a file offset of a time point in the lower bit-rate version corresponding with a current time point in the higher bit-rate version and may transition to begin retrieving and playing out data of the media file starting at that determined file offset.

As another example, when a client device requests download of a media file from a server, such as by sending an HTTP or FTP request for the file, the client device may request just one or more desired parts of the file (per user request or preference setting for instance) and may forgo downloading a remainder of the file.

For instance, if the client device will be downloading the media file for later playout, the device may have no use for multiple bit-rate versions of the media file. Consequently, if the media file as stored on the server contains multiple bit-rate versions of media content, the device may request and download just a particular bit-rate version of the media content, such as the highest bit-rate version for instance, and to forgo download of the other bit-rate version(s). Likewise, if the client device is operated by a user who speaks a particular language and the media file as stored on the server contains multiple language versions of media content, the device may be set (e.g., by user-configuration) to request and download just the particular language version and to forgo download of the other language version(s). Further, if the client device is not capable of playing trick-play tracks (e.g., a media player application or other logic on the device does not include a fast-forward button), the device may be set to download just the underlying media content of the file and to forgo downloading of any trick-play tracks.

In order to download just one or more parts of a media file while excluding download of the remainder of the media file, the device may first obtain the index of the media file and may then use the index as a basis to request download of the desired part(s), forgoing download of one or more remaining part(s). In practice, for instance, the device may request and download the index from a server and may then refer to the index to determine what data ranges in the file contain the desired parts, such as what file offsets demarcate the start and end of each part. The device may then transmit one or more download requests (e.g., HTTP or FTP requests) each requesting download of one or more determined data ranges of the file. For instance, in an HTTP request, the device may include an HTTP "range" header specifying a desired byte range of the file.

Without loss of generality, FIG. 1 depicts an example of a media file 12 that could be stored on a server for transmission to a client device or could be stored on a client device for playout to a user. As shown, the example media file includes a plurality of media file units U1, U2, U3, U4, . . . , Un, and a media file index 14.

In this example, each of the media file units U is an extent of data constituting a respective portion of the media file, such as a particular number of bytes, and is located at a particular position within the media file (even though the file itself may be fragmented in physical data storage). Thus, each unit could be characterized by a corresponding file offset specifying how far a start of the unit is from a start of the media file and perhaps by a size value or ending file offset specifying how far the end of the unit is from the start of the media file or from the start of the unit, and a computing device could use that characterization as a basis to retrieve the unit for transmission or playout.

For instance, the file offset of unit U1 may be P bytes, indicating that the start of unit U1 is P bytes from the start of the media file, and the length of unit U1 may be N bytes. Thus, to retrieve unit U1 from the media file, a computing device could retrieve data of the file starting at P bytes into the file and ending at P+N−1 bytes into the file. Likewise, if unit U2 immediately follows unit U1, then the file offset of unit U2 may be P+N bytes, indicating that the start of unit U2 is P+N bytes from the start of the media file. Thus, to retrieve unit U2 from the media file, a computing device could retrieve data of the media file starting at P+N bytes into the file.

In practice, units U may constitute data defining specific portions of media content for transmission or playout, such as particular versions, tracks, or time segments of the media content. For instance, unit U1 might define one bit-rate version of particular media content, unit U2 may define another bit-rate version of the same media content, and unit U2 may define still another bit-rate version of the same media content. Or units U1 and U2 may be define tracks or time segments of one bit-rate version of particular media content, and units U3 and U4 may define tracks or time segments of another bit-rate version of the same media content. Many other examples are possible as well.

As noted, example media file 12 includes an index 14, which functions as discussed above to indicate where various pieces of media content are located within the media file, so as to facilitate retrieval and transmission or playout of desired pieces. In the arrangement shown, index 14 is positioned at the start of the media file 12. In an alternative arrangement, however, the index could be positioned elsewhere within the media file, such as in the middle of the file or at the end of the file for instance, or could be stored separately from the file.

In an arrangement where the index 14 is provided within the media file, its location and size within the file may be predefined or specified in some manner. For instance, the first several bits of the media file could be a value specifying a file offset and data length of the index within the media file. That way, a computing device could read those first several bits of the file to determine where the index is located and could then retrieve the index for use as a reference to retrieve data corresponding with desired pieces of media content.

To indicate where particular pieces of the media content are located within the media file, index 14 may specify for each piece one or more corresponding file offsets. For example, the index may specify for each piece of media content an absolute file offset how far the start of data representing that piece of media content is from the start of the media file. And as another example, the index may specify for each piece of media content an absolute file offset indicating a mid-point within the media file and a relative file offset indicating how far the start of data representing that piece of media content is from that mid-point.

For instance, a unit may be a particular version (e.g., bit-rate version, language, or other version) of media content, and the index may indicate where the data representing that version of the media content is located within the media file by specifying a file offset of the unit. As another example, a unit may be a particular chapter of video media content within a particular version of the media content, and the index may indicate where the data representing that chapter is located within the media file by specifying an absolute file offset of the version and then a relative file offset of the chapter from the start of that version. And as still another example, a unit may be a particular time segment (such as a particular second) within a particular track of the media content, and the index may indicate where that time segment is located within the media file by specifying an absolute file offset of the track and a relative file offset of that time segment.

As can be seen, the index can be structured in many different ways, the particular details of which are not critical. In one example arrangement for instance, the index might specify one or more file offsets respectively for each version, one or more file offsets respectively for each track or chapter within each version, and one or more file offsets respectively for each time segment within each track or chapter within each version of the media content.

FIG. 2 is a simplified example of a representative index, showing how the index could hierarchically set forth file offsets for various pieces of media content. As shown, the example index specifies three bit-rate versions of media content, BR1, BR2, and BR3, and specifies respectively for each bit-rate version a file offset of where the bit-rate version starts within the media file and a size of the bit-rate version within the media file. (For simplicity, the figure represents each file offset value and size value with a text label.) Further, the index specifies respectively for each bit-rate version two chapters, CH1, CH2, and two corresponding trick-play tracks, TP1 and TP2, and specifies respectively for each chapter and trick-play track a file offset of where that piece of the media content starts within the media file and a size of that piece of media content within the media file. And still further, as shown partially for BR1 and CH1 by way of example, the index specifies various seconds SEC1, SEC2, SEC3 of the media content and specifies respectively for each second a file offset of where that second of media content starts within the media file and a size of that second within the media file. Of course, the representative index could include other information and could take other forms as well.

Provided with the index of FIG. 2, a computing device could readily retrieve for transmission or playout a desired piece of a bit-rate version of the media content, by referring to the index to determine a file offset of data representing that piece, and retrieving and transmitting or playing out data of the media file beginning at that file offset. For instance, the computing device could retrieve for playout or transmission chapter CH1 of bit-rate version BR1 by referring to the index to determine the file offset OFFSET2 of chapter of that bit-rate version and then retrieving and transmitting or playing out data of the file starting at that file offset. Likewise, the computing device could retrieve for playout or transmission media content beginning at a particular second SEC2 of CH1 of BR1 by similarly referring to the index to determine the file offset OFFSET4 of that second of media content and then retrieving and transmitting out or transmitting data of the media file starting at that file offset. Further, when transmitting or playing out that content, the computing device could readily transition to transmit or play out a different version of the media content (e.g., another bit-rate version, another language version, etc.), by using the index to determine a file offset in the other version corresponding with the current point in the version being transmitted or played out, and transitioning to retrieve and transmit or play out data of the media file starting at that file offset.

Figure 3:
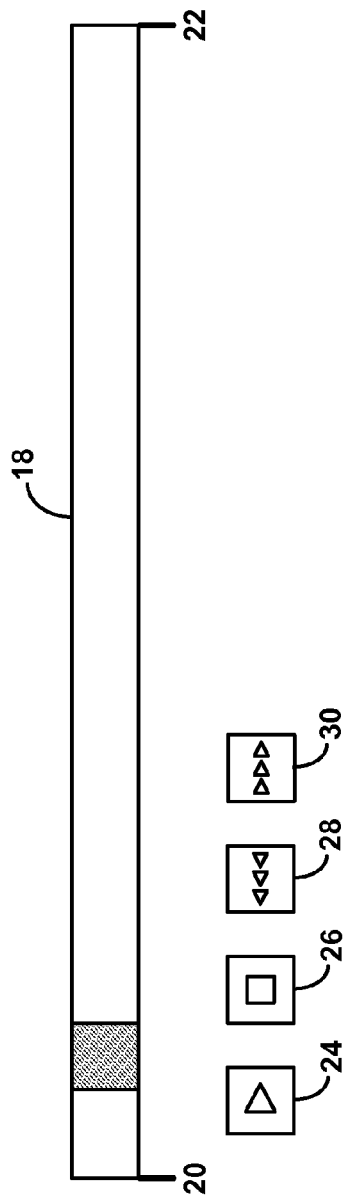
FIG. 3 depicts an example user interface through which a computing device may receive a request to play out a particular part of media content represented by data of a media file.

In practice, a computing device may include a media player (e.g., media player application) and may provide an associated user interface through which a user can request playout starting at a particular time point in media content defined by a media file stored on the device. FIG. 3 depicts a simplified example of such user interface, including a seek-function that a user can operate to request playout starting at a desired time point in the media content. In the example arrangement shown, the seek-function takes the form of a scroll bar 18 ranging from a start-time 20 of the media content to an end-time 22 of the media content. In an alternative arrangement, the seek-function could take other forms, such as a physical knob, a scroll-wheel, or one or more other mechanisms. Further, the example user interface provides control buttons including a play button 24, a stop button 26, a rewind button 28, and a fast-forward button 30.

With this user interface, a user may press the play button 24 to begin playing the media content. By default, the computing device may then begin playing out the media content of the file beginning at the start-time 20. To facilitate this, the computing device may refer to the index of the media file to determine the file offset where data representing the media content begins in the media file and may begin retrieving and playing out data of the media file starting at that file offset.

Further, the user may move the scroll bar 18 of the seek-function to a particular desired time point in the content, and the computing device may respond by transitioning to play out the media content beginning at that time point. To facilitate this, the computing device may likewise refer to the index of the media file to determine the file offset where data representing the designated time point of the media content is located and may transition to begin retrieving and playing out data of the media file beginning at that file offset.

Still further, while the computing device is playing out the media content at a particular time point, the user may press the fast-forward button 30, and the computing device may respond by transitioning to play out a fast-forward trick-play track of the media content beginning at the corresponding time point in a fast-forward trick-play track. To facilitate this, the computing device may refer to the index of the media file to determine the file offset where data of the trick-play track is located in the media file and perhaps a relative file offset of where data representing the corresponding time point in that trick-play track is located in the media file. The computing device may then begin retrieving and playing out data of the media file beginning at that point.

In general practice, a computing device may download a media file from a network server, the device may persistently store the media file, and the device may use the associated index of the media file as a basis to facilitate playout of media content as described above. To do so, for instance, the computing device may open a data connection (e.g., transport socket) with the server and may use HTTP, FTP, or another protocol to download the media file containing the index, or to separately download the index and the media file, from the same or different servers. Upon receipt of the media file and its index, the computing device may then play out media content of the media file.

In some cases, however, a computing device may obtain or establish a version of a media file that is different than the media file as stored on a server. For instance, given a media file stored on a server, a computing device may download from the server just a proper subset of the units of the media file and may forgo downloading a remainder of the media file such as additional units of the media file. Or given a media file stored on a server, a computing device may download that media file or portion thereof and may download from another server or other location on the same server some supplemental media content and add that supplemental media content into the downloaded media file part of the media file.

There may be various reasons for obtaining such a modified version of a media file. For example, although a media file as stored on a server may contain multiple bit-rate versions of media content as discussed above, a client device may only need one such version (perhaps the highest bit-rate version) for local playout. Consequently, the client device (e.g., media player application) may be preset to download just the one bit-rate version and to exclude from download to the client device one or more other bit-rate versions.

As another example, although a media file as stored on a server may contain multiple language versions of media content as discussed above, a client device could be provisioned to download just a particular language version (e.g., one specified by user-profile data on the device). Thus, when the client device downloads the media file, the client device may download just that language version and to exclude from download one or more other language versions.

As still another example, although the media file as stored on a server may contain various trick-play tracks, a client device may lack capability to play trick-play tracks. For instance, an applicable media player on the client device might not include fast-forward and rewind buttons. Consequently, the client device may be arranged to exclude the trick-play tracks from download when downloading the media file. Other examples are possible as well.

To facilitate downloading a proper subset of units of a media file while excluding from download a remainder of the media file (e.g., remaining media content units of the media file), a computing device may first obtain the index of the media file and may then use the index as a basis to request and receive just the desired proper subset.

To download the index, for instance, the computing device may open a transport socket with a server that contains the index and may send an HTTP, FTP, or other request to the server, requesting the index. If the index is at a predefined storage location, the computing device may specify that location in the download request. With the example arrangement discussed above, for instance, the computing device could first begin downloading the media file until the device has obtained bits indicating where the index is located, and the device can then discontinue download of the media file. The device can then request and receive the index from the indicated location.

Once the device has downloaded or otherwise obtained the index of the media file, the device may then use the index as a basis to download just a proper subset of units of the media file. For example, with the example shown in FIG. 2, if the device is arranged to download just bit-rate version BR3, the device may determine from the index where that bit-rate version is located in the file (namely, at OFFSET14) and may request and receive data of the media file from that location, and the device may forgo downloading of bit-rate versions BR1 and BR2. The device may then persistently store the downloaded data.

As another example, if the media file contains video content and corresponding audio content in a particular language, the device may be arranged to separately download audio content in a different language and to add that separately downloaded audio content to the media file as supplemental media content, to facilitate playout of the video content with the separately downloaded audio content. Or if the media file contains audio and video content, the device may be arranged to separately download subtitle data and to add that subtitle-data to the media file for playout with the audio and video content. The device may add such supplemental content at the end of the media file or at some other point within the media file. Other examples are possible as well.

When a device obtains or establishes a modified media file like this, the index of the media file may no longer properly correlate media content with units of the media file. For instance, although the modified media file may exclude one or more units, the index may still indicate the presence of those units at particular locations in the media file. Further, although the modified media file may include one or more supplemental units, the index may not indicate the presence of those units in the media file. Consequently, a computing device may be unable to properly play out media content based on the index, or errors in playout may occur.

Figures 4A, 4B:
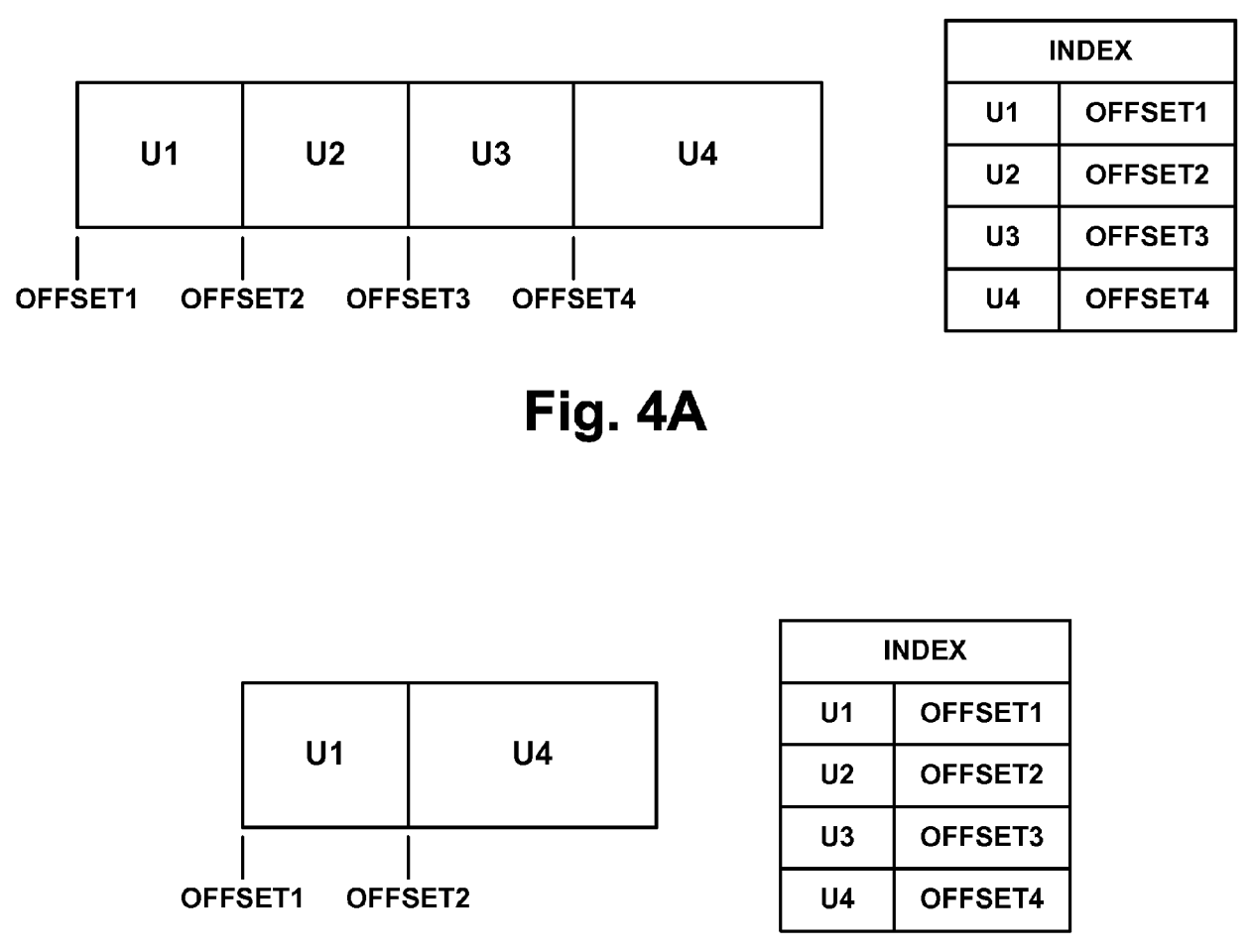

For example, consider a scenario as shown in FIG. 4A, where a media file includes units U1, U2, U3, and U4 in sequential order, and the index of the media file specifies a file offset respectively for each of these units, namely U1:OFFSET1, U2:OFFSET2, U3:OFFSET3, and U4:OFFSET4. If a computing device downloads just units U1 and U4, and does not download intervening units U2 and U3, the resulting modified media file as stored by the computing device would contain unit U1 followed by unit U4, as shown in FIG. 4B. Thus, unit U4 would be positioned in the media file at the file offset where unit U2 was originally positioned in the media file, namely OFFSET2. However, the index would not indicate this but would rather still indicate that unit U4 is positioned at OFFSET4. Consequently, when a computing device seeks to play out unit U4, the device may retrieve and play out data beginning at OFFSET4, but that would not be unit U4.

As another example, in the same scenario with a media file including sequential units U1, U2, U3, and U4, if a computing device downloads supplemental unit S1 and inserts the unit between units U3 and U4, the supplemental unit S1 would be positioned in the media file at the file offset OFFSET4 where unit U4 was originally positioned, and unit U4 would be positioned farther away from the start of the file than it was originally, as shown in FIG. 4C. However, the index would likewise not indicate this but would once again still indicate that unit U4 is positioned at OFFSET4. Consequently, when a computing device seeks to play out unit U4, the computing device may retrieve and play out data beginning at OFFSET4, but that would be media content of S1 rather than media content of U4.

To help overcome this problem, a computing device may be arranged to adjust the index of a media file to account for a modification of the media file, such as the omission of units from the media file and/or addition of units to the media file. In particular, the computing device may shift or otherwise adjust one or more file offsets of one or more downloaded units of the media file so that the file offsets properly correspond with indicated media content.

In the first example above, for instance, where the computing device omits units U2 and U3 as in FIG. 4B, the device may automatically modify the index by reducing the file offset of unit U4 to be what the file offset of unit U2 was originally, namely OFFSET2. Consequently, while the index of the media file may have correlated one or more pieces of media content with unit U4 at a particular file offset OFFSET4 in the media file, the modified index of the modified media file would correlate those pieces of media content with unit U4 at the reduced file offset OFFSET2, as shown in FIG. 4D. When the computing device seeks to play out such media content, the computing device may then refer to the index and properly determine where the associated data of the media file is located and begin retrieving and playing out that data.

Likewise, in the second example above, where the computing device adds supplemental unit S1 between units U3 and U4 as in FIG. 4C, the device may automatically modify the index by increasing the file offset of unit U4 to account for the fact that unit U4 has been shifted to a more distant location in the media file. Consequently, while the index of the media file may have correlated one or more pieces of media content with unit U4 at a particular file offset in the media file, the modified index of the modified media file would correlate those pieces of media content with unit U4 at the increased file offset OFFSET5, as shown in FIG. 4E. When the computing device seeks to play out such media content, the computing device may then likewise refer to the index and properly determine where the associated data of the media file is located and begin retrieving and playing out that data.

In addition to shifting the file offset of unit U4 to account for the modified position of unit U4 in the media file as in these examples, the computing device may also make other associated changes to the index. For instance, to the extent other entries of the index point to unit U4, the computing device may revise those other entries to point to the adjusted location of unit U4. Further, to the extent the computing device omits one or more units from the media file, the computing device may remove from the index any references to those omitted units. Other examples are possible as well.

Figure 5:
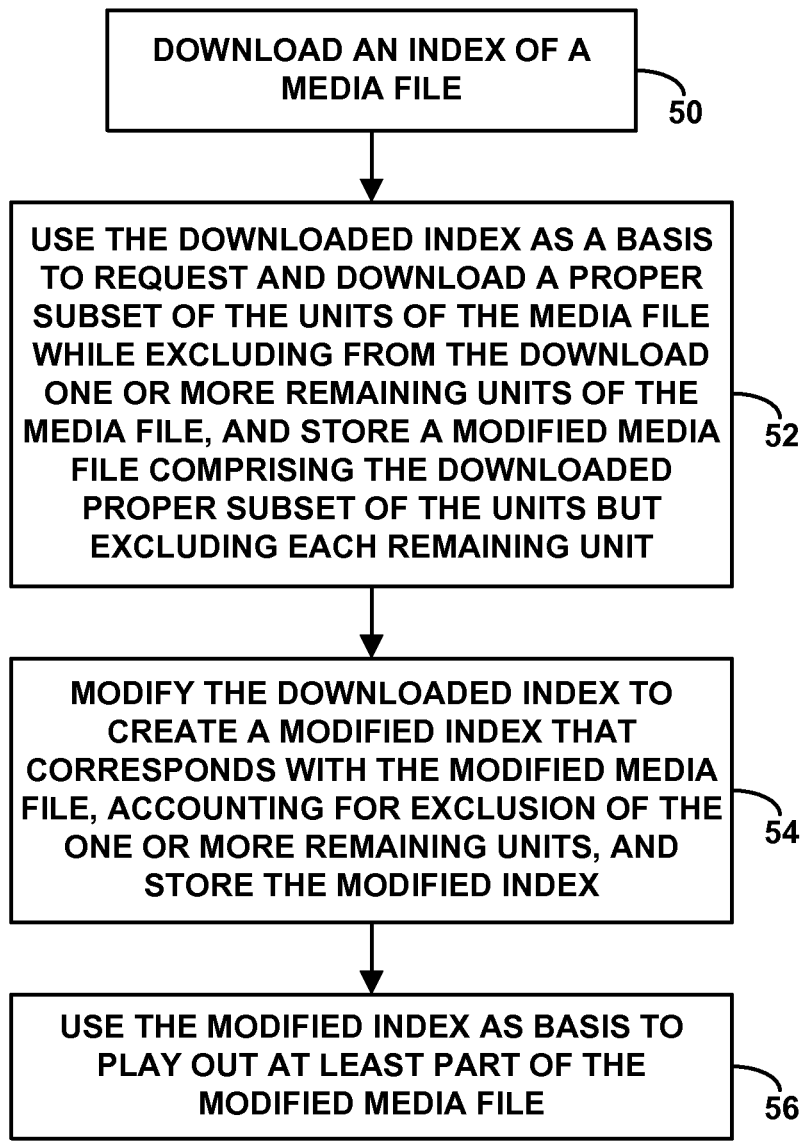
FIG. 5 is a flow chart depicting functions that can be implemented in accordance with an example method.

FIG. 5 is a next a flow chart depicting functions that can be carried out in accordance with an example implementation of the present method. These functions can be carried out by a computing device (client device), such as a personal media player, personal computer, cell phone, tablet computer, television, home entertainment system, in-vehicle entertainment system, or other device now known or later developed. In particular, the functions can be encoded in program instructions that are stored on a non-transitory computer readable medium such as an optical disc, hard drive, or other storage device and are executable by a processor.

As shown in FIG. 5, at block 50, the device may download an index of a media file. In particular, the media file may contain multiple units of data representing media content, and the index may correlate each of various pieces of the media content with a respective one of the units, indicating a file offset where the respective unit is located in the media file.

At block 52, the device may then use the downloaded index as a basis to request and download a proper subset of the units of the media file while excluding from the download one or more remaining units of the media file, and the device would store in data storage a modified media file comprising the downloaded proper subset of the units but excluding each remaining unit. For instance, the device may refer to the downloaded index to determine a file offset range for just each desired portion of the media file (e.g., a starting file offset and ending file offset), and the device may transmit to a network server a request for each such portion, such as an HTTP request including a range header that specifies the determined file offset range. For each such request, the device may then receive from the network server the requested portion as at least part of the modified media file.

In line with the discussion above, for example, the device may use the downloaded index as a basis to download just one bit-rate version of multiple different bit-rate versions of media content represented by the media file or just one language version of multiple language versions represented by the media file, to exclude download of one or more trick-play tracks defined by the media file, to exclude download of subtitle data carried by the media file, or to selectively download some other proper subset of the data units that make up the media file.

At block 54, in accordance with the method, the device may modify the downloaded index to create a modified index that corresponds with the modified media file, and may store the modified index in data storage (e.g., as a header of the modified media file). To do so, as discussed above, the device may adjust at least one file offset of the proper subset of units to account for exclusion of the one or more remaining units of the media file. For instance, the device may decrease the file offset of a unit to properly reflect the fact that the unit is closer to the start of the media file as a result of omission of one or more intervening units. As a result, the modified index would correlate each unit of the modified media file with a respective file offset indicating where the unit is located in the modified media file.

At block 56, the device may then use the modified index as a basis to play out at least part of the modified media file on a user interface of the device. In line with the discussion above, for instance, the device may receive a user request to play out a particular piece of media content that corresponds with a particular unit of the modified media file, and, responsive to that request, the device may refer to the modified index to determine a particular file offset of that unit. That particular file offset may be one that was adjusted to account for exclusion of the one or more remaining units of the media file at step 54. The device may then use that determined file offset to retrieve and play out the modified media file beginning at the particular unit, such as by beginning to retrieve and play out data of the media file starting at the determined file offset.

As a specific example of this, the particular piece of media content may comprise a particular time point in the media content. For instance, through a seek-function as described above, the device may receive a user request to start playing or jump to playout of the media content at a particular time point, perhaps in a particular version of the media content, such as a particular language version. The device may then refer to the modified index to determine a file offset corresponding with that time point and may begin retrieving and playing out data of the modified media file starting at that file offset. And as another example, the particular piece of media content could comprise a trick-play track corresponding with underlying media content, and the request could be a trick-play request such as described above.

Furthermore, as discussed above, the functions of the example method may also involve downloading to the client device one or more supplemental units of data representing supplemental media content, and supplementing the downloaded proper subset of units with the one or more downloaded supplemental units, so as to include in the modified media file the one or more downloaded supplemental units in addition to the downloaded proper subset of units. In that case, the function of modifying the downloaded index accounts for addition of the one or more supplemental units. For instance, if a supplemental unit is inserted in the middle of the media file, the file offset of each subsequent unit can be increased to account for the unit being farther away from the start of the media file.

As a specific example of this, the media content may comprise visual media content, such as a movie for instance, and the supplemental media content may comprise audio media content such as speech or music that corresponds with (e.g., can be played together with or otherwise in association with) the video media content. And as another example, the media content may comprise audio and video media content, and the supplemental media content may comprise subtitle content that corresponds with (e.g., can be presented along with) the audio and video media content. Other examples are possible as well.

Figure 6:
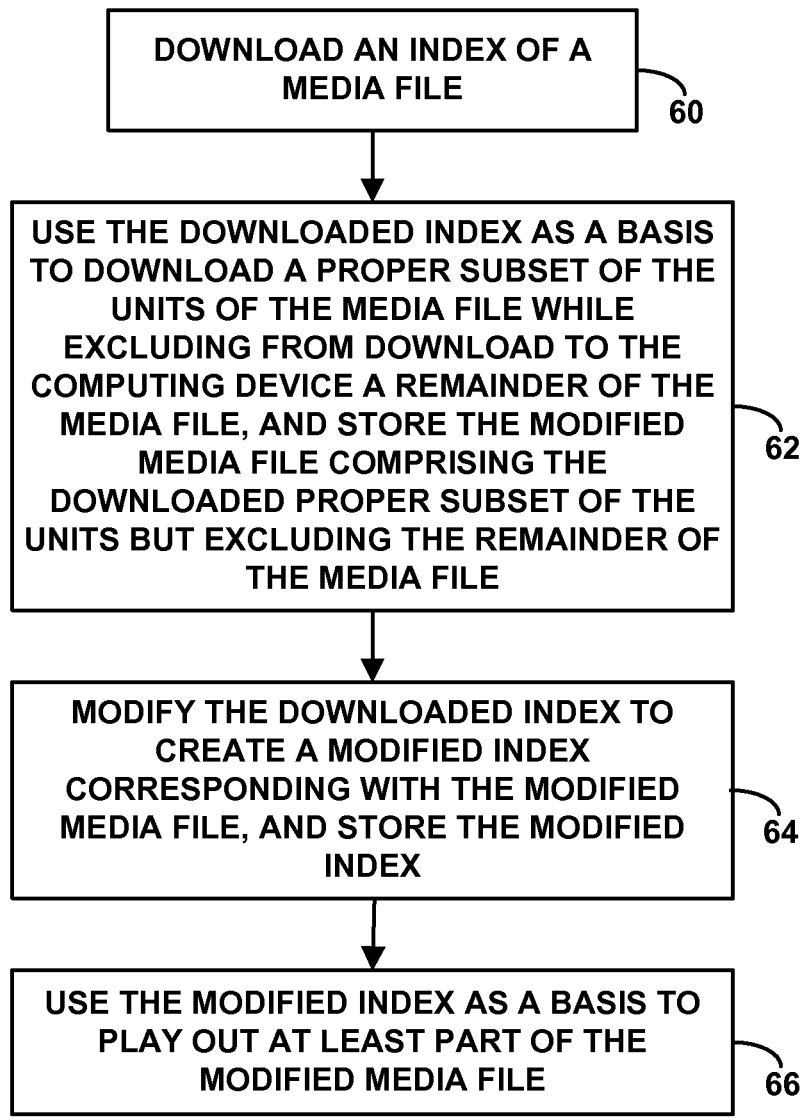
FIG. 6 is another flow chart depicting functions that can be implemented in accordance with an example method.

FIG. 6 is next another flow chart depicting functions that can be carried out in accordance with an example implementation of the present method. As with the method depicted in FIG. 5, the functions of FIG. 6 can be carried out by a computing device, such as by program instructions stored in data storage and executable by a processor.

As shown in FIG. 6, at block 60, the method first includes downloading to the computing device, via a network communication interface, an index of a media file. The media file may include multiple units and the index may correlate each unit with a respective file offset indicating where the unit is located in the media file. For instance, each unit may be data representing a particular piece of media content.

At block 62, the method then involves using the downloaded index as a basis to download to the computing device, via the network communication interface, a proper subset of the units of the media file while excluding from download to the computing device a remainder of the media file (e.g., the remaining units of media content), and storing in the data storage a modified media file comprising the downloaded proper subset of the units but excluding the remainder of the media file.

Further, at block 64, the method involves modifying the downloaded index to create a modified index corresponding with the modified media file and storing the modified index in data storage. For instance, the computing device may adjust the file offset of each of at least one of the units to account for exclusion of the remainder of the media file from the modified media file, such as by decreasing the file offset of a unit to account for removal of a preceding unit. As a result, the modified index may correlate each unit of the modified media file with a respective file offset indicating where the unit is located in the modified media file.

At block 66, the method may then involve using the modified index as a basis to play out at least part of the modified media file on a user interface of the computing device. For instance, in line with the discussion above, the computing device may receive a user request to play a particular portion of the media content, and the device may then refer to the modified index to determine an adjusted file offset corresponding with that piece of media content and may retrieve and play out data of the modified media file starting at that file offset.

Figure 7:
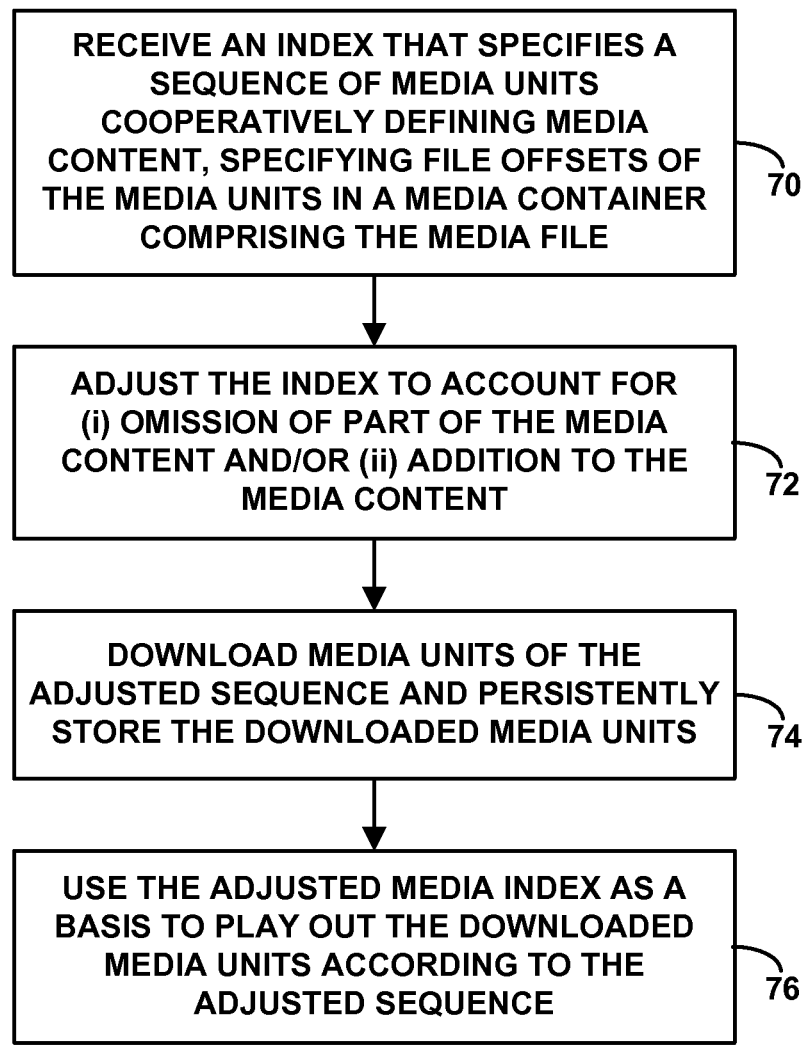
FIG. 7 is another flow chart depicting functions that can be implemented in accordance with an example method.

FIG. 7 is next another flow chart depicting functions that can be carried out in accordance with an example implementation of the present method.

As shown in FIG. 7, at block 70, the method may involve a client device receiving (e.g., downloading from a server, or otherwise receiving) an index that specifies a sequence of media units cooperatively defining media content, such as by specifying file offsets of the various media units in a media container comprising the media file. At block 72, after receiving the index, the client device may then adjust the index to account for a change such as (i) omission of part of the media content and/or (ii) addition to the media content. For instance, the client device may shift the file offset of at least one of the media units to account for the change. As a result, the client device may thereby establish an adjusted index specifying an adjusted sequence of media units cooperatively defining adjusted media content.

At block 74, the client device may then download media units of the adjusted sequence and persistently store in data storage the downloaded media units. And at block 76, the method may involve the client device or some other device using the adjusted media index as a basis to play out the downloaded media units according to the adjusted sequence. For instance, where the adjustment of the index involved shifting one or more file offsets, the client device or other device may use the shifted file offset of at least one media unit as a basis to retrieve from data storage and play out the at least one media unit.

In this implementation of the method, the adjustment to the sequence of media units could be the removal of one or more media units from the sequence. Other media units of the sequence may then still be in the same relative order with respect to each other but may be have different timing than they did in the original media file. For instance, given units U1, U2, and U3 in the original media file, unit U3 might normally be played out immediately after unit U2. But if unit U2 is removed, then unit U3 may be played out immediately after unit U1. Other examples are possible as well.

For instance, in line with the discussion above, the adjustment could be the omission of a trick-play track of the media content, omitting all but one of multiple bit-rate versions of the media content, omitting all but one language version of the media content, additional of supplemental content, or any of a variety of other adjustments.

Figure 8:
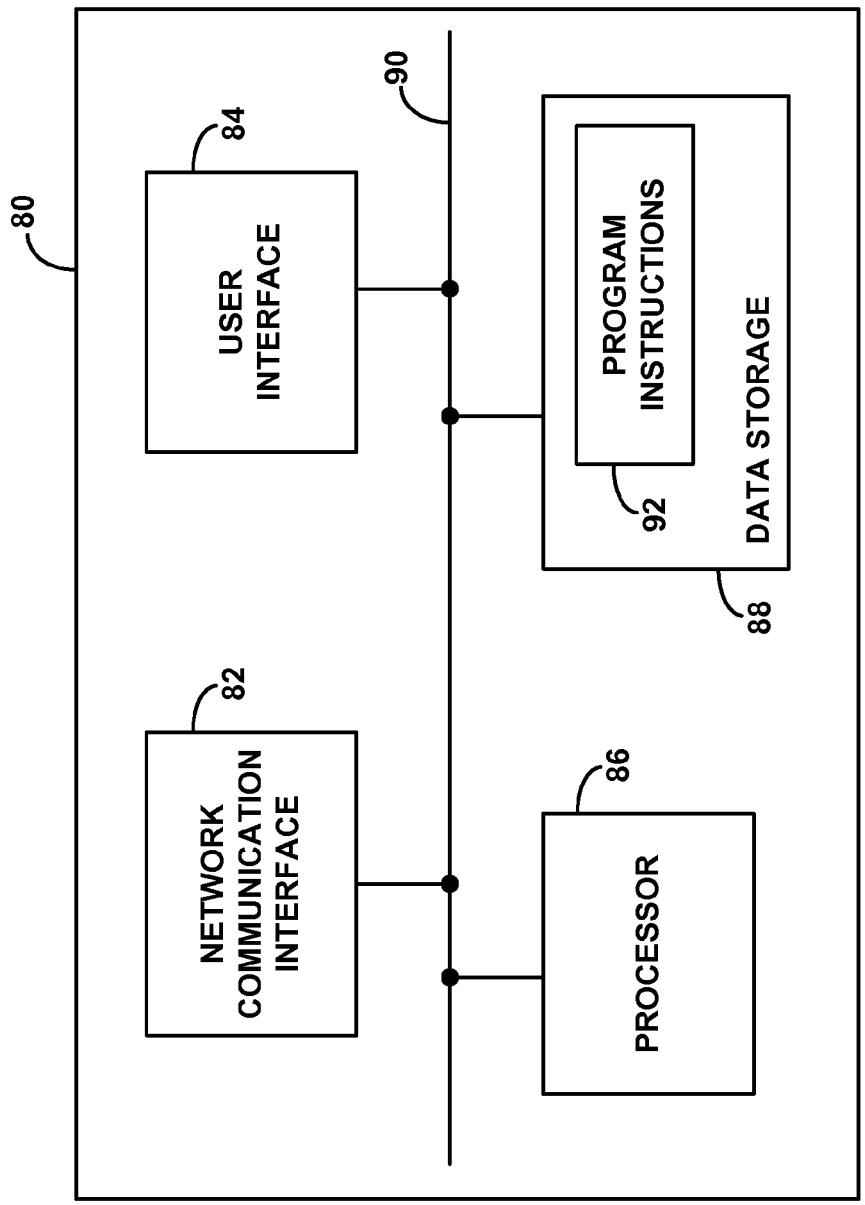
FIG. 8 is a simplified block diagram of an example computing device.

Finally, FIG. 8 a simplified block diagram of representative computing device 80 that could be arranged to implement some or all of the functions described above. As shown in FIG. 8, the representative client 80 includes a network communication interface 82, a user interface 84, a processor 86, and data storage 88, all of which may be communicatively linked together by a system bus, network, or other connection mechanism 90.

Network communication interface 82 enables the computing device 80 to engage in communication via network 14, so as download of an index and media file units as discussed above. The network communication interface may support wired, wireless, circuit-switched, and/or packet-switched communication in a manner now known or later developed. For example, the interface could be a wired or wireless Ethernet network interface module or a cellular wireless communication module. Other examples are possible as well.

User interface 84 enables the computing device 80 to interact with a user of the client, such as to receive user input defining various configuration or profile settings (e.g., bit-rate or language preferences, etc.), user requests to download particular media content, and user requests for playout of particular pieces of media content (such as seek-requests to play at particular time points in media content). As such, the user interface may include input components such as a keypad or keyboard, a touch-screen interface, a microphone, and/or a camera. Further, the user interface may include output components such as a display screen and a sound speaker for instance. Moreover, the user interface may include circuitry for converting between analog and digital forms of user input and user output.

Processor 86 may comprise one or more general purpose processors (e.g., INTEL processors) and/or one or more special purpose processors (e.g., digital signal processors or application specific integrated circuits) and may be integrated in whole or in part with network communication interface 84. Data storage 88, in turn, may comprise one or more non-transitory volatile and/or non-volatile storage components, such as optical, magnetic, organic, or flash memory components for instance, and may be integrated in whole or in part with processor 86. Data storage 88 may be considered data storage for the computing device 80 and may be provided as an integral component of the client or as removable or external data storage, such as an external or networked hard drive for instance.

As shown, the data storage 88 may hold program instructions 92 (such as machine language instructions or other code for instance) that are executable by processor 86 to cause the computing device to carry out various functions as described above.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A non-transitory computer readable medium having stored thereon program instructions executable by a processor to cause a client device to carry out functions comprising:
   downloading to the client device an index of a media file, wherein the media file contains a plurality of units of data representing media content and the index correlates each of a plurality of pieces of the media content with a respective unit of the plurality of units of data, indicating a file offset where the respective unit is located in the media file;
   using the downloaded index as a basis to request and download to the client device a proper subset of the units of the media file while excluding from download to the client device one or more remaining units of the media file, and storing in data storage a modified media file comprising the downloaded proper subset of the units of data but excluding each remaining unit of the media file;
   modifying the downloaded index to create a modified index corresponding with the modified media file, wherein modifying the downloaded index comprises adjusting at least one file offset of the proper subset of units to account for exclusion of the one or more remaining units of the media file;
   storing the modified index in the data storage; and
   using the modified index as a basis to play out at least part of the modified media file on a user interface of the client device.

2. The non-transitory computer readable medium of claim 1, wherein using the modified index as a basis to play out at least part of the modified media file comprises:
   receiving a request to play out a particular piece of the media content, the particular piece of media content corresponding with a particular unit of the modified media file;
   responsive to the request, using the modified index to determine a particular file offset of the particular unit, the particular file offset being one that was adjusted to account for exclusion of the one or more remaining units of the media file; and
   using the determined file offset to retrieve and play out data of the modified media file.

3. The non-transitory computer readable medium of claim 2,
   wherein the particular piece of the media content comprises a particular time point in the media content.

4. The non-transitory computer readable medium of claim 3, wherein the request is a seek-function request.

5. The non-transitory computer readable medium of claim 2,
   wherein the particular piece of the media content comprises a trick-play track corresponding with underlying media content.

6. The non-transitory computer readable medium of claim 5, wherein the request is a trick-play request.

7. The non-transitory computer readable medium of claim 1, wherein the functions further comprise:
   downloading to the client device one or more supplemental units of data representing supplemental media content; and
   supplementing the downloaded proper subset of units with the one or more downloaded supplemental units, so as to include in the modified media file the one or more downloaded supplemental units in addition to the downloaded proper subset of units,
   wherein modifying the downloaded index accounts for addition of the one or more supplemental units.

8. The non-transitory computer readable medium of claim 7,
   wherein the media content comprises visual media content, and wherein the supplemental media content comprises audio media content corresponding with the video media content.

9. The non-transitory computer readable medium of claim 7,
   wherein the media content comprises audio and video media content, and wherein the supplemental media content comprises subtitle content corresponding with the audio and video media content.

10. The non-transitory computer readable medium of claim 1, wherein storing the modified index in the data storage comprises storing the modified index as a header of the modified media file.

11. The non-transitory computer readable medium of claim 1,
    wherein media content represented by the plurality of units of data of the media file includes a plurality of different bit-rate versions, and
    wherein using the downloaded index as a basis to request and download to the client device a proper subset of the units of the media file while excluding from download to the client device one or more remaining units of the media file comprises using the downloaded index as a basis to request and download to the client device one or more of the units representing a single bit-rate version of the plurality of bit-rate versions and excluding from download to the client device one or more units representing each other bit-rate version of the plurality of bit-rate versions.

12. The non-transitory computer readable medium of claim 11, wherein the single bit-rate version is selected from the group consisting of a highest bit-rate version of the plurality of bit-rate versions and a lowest bit-rate version of the plurality of bit-rate versions.

13. The non-transitory computer readable medium of claim 1,
    wherein the media content represented by the plurality of units of data of the media file includes one or more trick-play tracks, and
    wherein excluding from download to the client device one or more remaining units of the media file comprises excluding from download to the client device one or more units representing the one or more trick-play tracks.

14. The non-transitory computer readable medium of claim 1,
    wherein the media content represented by the plurality of units of data of the media file includes a plurality of language versions, and
    wherein using the downloaded index as a basis to request and download to the client device a proper subset of the units of the media file while excluding from download to the client device one or more remaining units of the media file comprises using the downloaded index as a basis to request and download to the client device one or more of the units representing a single language version of the plurality of language versions and excluding from download to the client device one or more units representing each other language version of the plurality of bit-rate versions.

15. The non-transitory computer readable medium of claim 2,
    wherein the media content represented by the plurality of units of data of the media file includes a subtitle data, and wherein excluding from download to the client device one or more remaining units of the media file comprises excluding from download to the client device one or more units representing the subtitle data.

16. The non-transitory computer readable medium of claim 1,
wherein using the downloaded index as a basis to request and download to the client device a proper subset of the units of the media file while excluding from download to the client device one or more remaining units of the media file comprises (i) referring to the downloaded index to determine a file offset range for at least one portion of the media file and (ii) transmitting to a network server a request for the at least one portion of the media file, the request specifying the determined file offset range, and (iii) receiving in response from the network server the at least one portion of the media file.

17. The non-transitory computer readable medium of claim 16, wherein the request is a Hypertext Transfer Protocol request having a range header specifying the determined file offset range.

18. A computing device comprising:
a network communication interface;
a user interface;
a processor;
data storage; and
program instructions stored in the data storage and executable by the processor to cause the computing device to carry out functions comprising:
  (a) downloading to the computing device, via the network communication interface, an index of a media file, wherein the media file has a plurality of units and the index correlates each unit of the plurality with a respective file offset indicating where the unit is located in the media file,
  (b) using the downloaded index as a basis to download to the computing device, via the network communication interface, a proper subset of the units of the media file while excluding from download to the computing device a remainder of the media file, and storing in the data storage a modified media file comprising the downloaded proper subset of the units but excluding the remainder of the media file, and
  (c) modifying the downloaded index to create a modified index corresponding with the modified media file, wherein modifying the downloaded index comprises adjusting the file offset of each of at least one of the units to account for exclusion of the remainder of the media file from the modified media file, and wherein the modified index correlates each unit of the modified media file with a respective file offset indicating where the unit is located in the modified media file,
  (d) storing the modified index in the data storage.

19. The computing device of claim 18, wherein the functions further comprise using the modified index as a basis to play out at least part of the modified media file on the user interface.

20. A method comprising:
a client device receiving an index specifying a sequence of media units cooperatively defining media content;
after receiving the index, the client device adjusting the index to account for a change comprising at least one of (i) omission of part of the media content and (ii) addition to the media content, thereby establishing an adjusted index specifying an adjusted sequence of media units cooperatively defining adjusted media content;
the client device downloading media units of the adjusted sequence and persistently storing in data storage the downloaded media units; and
using the adjusted media index as a basis to play out the downloaded media units according to the adjusted sequence.

21. The method of claim 20, wherein receiving the index comprises downloading the index from a server.

22. The method of claim 20,
wherein the index defines for each media unit a respective file offset indicating where the media unit is to be located logically within a media container, and
wherein adjusting the index to account for the change comprises shifting the file offset of at least one of the media units to account for the change.

23. The method of claim 22, wherein using the adjusted media index as a basis to play out the downloaded media units according to the adjusted sequence comprises using the shifted file offset of the at least one media unit as a basis to retrieve from the data storage and play out the at least one media unit.

24. The method of claim 20, wherein the media content includes at least one trick-play track, and wherein the change comprises omission of the trick-play track.

25. The method of claim 20, wherein the media content includes multiple bit-rate versions of media, and wherein the change comprises omission of all but one of the bit-rate versions.

26. The method of claim 20, wherein the media content includes multiple language versions, and wherein the change comprises omission of all but one of the language versions.

27. The method of claim 20, wherein the change comprises addition of supplemental media to the media content.

* * * * *